United States Patent Office

3,649,655
Patented Mar. 14, 1972

3,649,655
PROCESS FOR PREPARING ESTERS BY REACTING A MONOBASIC ORGANIC ACID WITH A SECONDARY ALKYL HALIDE
Charles M. Selwitz, Pitcairn, Pa., assignor to Gulf Research & Development Company, Pittsburgh, Pa.
No Drawing. Filed Sept. 29, 1969, Ser. No. 862,042
Int. Cl. C07c *67/00, 67/04*
U.S. Cl. 260—410
15 Claims

ABSTRACT OF THE DISCLOSURE

A process for preparing an ester which involves reacting a monobasic organic acid with a secondary alkyl halide in the presence of ferric, stannic or zinc chlorides or bromides.

This invention relates to a process for preparing an ester from a monobasic carboxylic acid and a secondary alkyl chloride or an alkyl bromide.

In Canadian Patent No. 765,833, dated Aug. 22, 1967, it is shown that esters can be prepared by reacting a monobasic carboxylic acid with an organic halide selected from the group consisting of primary straight and branched chain alkyl halides, secondary straight and branched chain alkyl halides, primary and secondary cyclic halides, straight and branched chain olefinic halides and aromatic halides in the presence of a compound composed of said carboxylic acid wherein an acid hydrogen thereof is replaced by an element selected from the group consisting of lithium, magnesium, calcium, scandium, titanium, vanadium, chromium, manganese, iron, cobalt, nickel, copper, zinc, boron, aluminum, silicon, phosphorus, sulfur, zirconium, tin, antimony and bismuth to form an ester and a hydrogen halide.

I have found that an ester can be produced in good yields from the reaction of a secondary alkyl chloride or a secondary alkyl bromide with a monobasic carboxylic acid at relatively mild temperature provided a catalyst selected from the group consisting of ferric, stannic or zinc chlorides or bromides is used.

One of the reactants required in the process defined and claimed herein to obtain an ester is a monobasic organic acid. Dibasic organic acids cannot be made to produce esters under the reaction conditions defined herein. Among the monobasic organic carboxylic acids that can be employed and are preferred in the practice of this invention are saturated straight chain aliphatic monobasic acids having from two to 30 carbon atoms, preferably from two to 22 carbon atoms, and saturated branched chain aliphatic monobasic acids having from two to 30 carbon atoms, preferably from two to 22 carbon atoms. Specific examples of such acids are: acetic, propionic, butyric, valeric, caproic, oenanthic, caprylic, pelargonic, capric, undecanoic, lauric, tridecanoic, myristic, pentadecanoic, palmitic, margaric, stearic, nonadecanoic, arachidic, heneicosanoic, behenic, tricosanoic, lignoceric, pentacosanoic, hexacosanoic, carboceric, octacosanoic, montanic, triacontanoic, isobutyric, isovaleric, pivalic, isocaproic, 2-methylbutanoic, 3-methylbutanoic, 2-methylpentanoic, 2-ethylbutanoic, 3-methylpentanoic, 2,2-dimethylbutanoic, 3,3-dimethylbutanoic, 2,3-dimethylbutanoic, 2-ethylhexanoic, methylneopentylacetic, 2,2-dimethylpentanoic, 2,2-dimethylheptanoic, 2,2-dimethylhexanoic, 2,2-dimethyloctanoic, 2,2-dimethylpelargonic, 2,2 - dimethyldecanoic, 2,2 - dimethylundecanoic, 2,2-dimethyllauric, 2,2-dimethyltridecanoic, 2,2-dimethylmyristic, 2,2-dimethylpentadecanoic, 2,2-dimethylpalmitic, 2,2-dimethylmargaric, 2,2-dimethylstearic, 2,2-dimethylnonadecanoic, 2,2-dimethylarachidic, 2,2-dimethylheneicosanoic, 2,2 - dimethyltricosanoic, 2,2 - dimethylpentacosanoic, 2,2-dimethylcarboceric, 2,2-dimethylmontanic, 3,3-dimethylbutyric, 3,3-dimethylpentanoic, 3,3-dimethylhexanoic, 3-methyl-3-ethylpentanoic, 3,3,5,5-tetramethylhexanoic, 3-methyl-3-ethylheptanoic, 3-methyl - 3 - ethylpentanoic, 3-methyl-3-ethylpelargonic, 3-methyl-3-ethylundecanoic, 3-methyl-3-ethyltridecanoic, 3-methyl-3-ethylpentadecanoic, 3-methyl-3-ethylmargaric, 3-methyl-3-ethylnonadecanoic, 4,4-dimethylpentanoic, 4,4-dimethylhexanoic, 4,4-dimethylheptanoic, 4-methyl - 4 - ethylhexanoic, 4,4,6,6-tetramethylheptanoic, 4-methyl-4-ethyloctanoic, 4-methyl-4-ethylhexanoic, 4-methyl-4-ethyldecanoic, 4-methyl-4-ethyllauric, 4-methyl - 4 - ethylmyristic, 4-methyl-4-ethylpalmitic, 4-methyl-4-ethylstearic, 4-methyl-4-ethylarachidic, dineopentylacetic, methyl-t-butylneopentylacetic, etc.

To react with the monobasic organic acid defined above to produce the desired ester in accordance with the process defined and claimed herein there must be employed a secondary alkyl chloride or a secondary alkyl bromide having from three to 40 carbon atoms, preferably from six to 35 carbon atoms. Examples of such secondary alkyl halides that can be used are 2-chloropropane, 2-bromopropane, 2-chlorobutane, 2-bromobutane, 2-chloropentane, 2-bromopentane, 3-chloropentane, 3-bromopentane, 2-chlorohexane, 2-bromohexane, 3-chlorohexane, 3-bromohexane, 2-chloroheptane, 2-bromoheptane, 3-chloroheptane, 3-bromoheptane, 4-chloroheptane, 4-bromoheptane, 2-chlorooctane, 2-bromooctane, 3-chlorooctane, 3-bromooctane, 4-chlorooctane, 4-bromooctane, 2-chlorononane, 2-bromononane, 3-chlorononane, 3-bromononane, 4-chlorononane, 4-bromononane, 5-chlorononane, 5-bromononane, 2-chlorodecane, 2-bromodecane, 3-chlorodecane, 3-bromodecane, 4-chlorodecane, 4-bromodecane, 5-chlorodecane, 5-bromodecane, 2-chloroundecane, 2-bromoundecane, 3-chloroundecane, 3-bromoundecane, 4-chloroundecane, 4-bromoundecane, 5-chloroundecane, 5-bromoundecane, 6-chloroundecane, 6-bromoundecane, 2-chlorododecane, 2-bromododecane, 3-chlorododecane, 3-bromododecane, 4-chlorododecane, 4-bromododecane, 5-chlorododecane, 5-bromododecane, 6-chlorododecane, 6-bromododecane, 2-chlorotridecane, 2-bromotridecane, 3-chlorotridecane, 3-bromotridecane, 4-chlorotridecane, 4-bromotridecane, 5-chlorotridecane, 5-bromotridecane, 6-chlorotridecane, 6-bromotridecane, 7-chlorotridecane, 7-bromotridecane, 2-chlorotetradecane, 2-bromotradecane, 3-chlorotetradecane, 3-bromotetradecane, 4-chlorotetradecane, 4-bromotetradecane, 5-chlorotetradecane, 5-bromotetradecane, 6-chlorotetradecane, 6-bromotetradecane, 7-chlorotetradecane, 7-bromotetradecane, 2-chloropentadecane, 2 - bromopentadecane, 3 - chloropentadecane, 3-bromopentadecane, 4-chloropentadecane, 4-bromopentadecane, 5-chloropentadecane, 5-bromopentadecane, 6-chloropentadecane, 6-bromopentadecane, 7-chloropentadecane, 7-bromopentadecane, 8-chloropentadecane, 8-bromopentadecane, 2-chlorohexadecane, 2-bromohexadecane, 3-chlorohexadecane, 3-bromohexadecane, 4-chlorohexadecane, 4-bromohexadecane, 5-chlorohexadecane, 5-bromohexadecane, 6-chlorohexadecane, 5-chloroheptadecane, 5-bromoheptadecane, 6-chloroheptadecane, 6-bromoheptadecane, 7-chloroheptadecane, 7-bromoheptadecane, 8-chloroheptadecane, 8-bromoheptadecane, 9-chloroheptadecane, 9-bromoheptadecane, 2-chlorooctadecane, 2-bromooctadecane, 3-chlorooctadecane, 3-bromooctadecane, 4-chlorooctadecane, 4-bromooctadecane, 2-chlorohexacosane, 2-bromohexacosane, 13-chlorohexacosane, 13-bromohexacosane, 2-chloroheptacosane, 2-bromoheptacosane, 13-chloroheptacosane, 13-bromoheptacosane, 2 - chlorooctacosane, 2 - bromooctacosane, 14-chlorooctacosane, 14-bromooctacosane, 2-chlorononacosane, 2-bromononacosane, 14-chlorononacosane, 14-bromononacosane, 2-chlorotricontane, 2-bromotricontane, 15-chlorotricontane, 15-bromotricontane, 10-bromononadecane, 2-chloroeicosane, 2-bromoeicosane, 5-chlorooctadecane, 5-bromooctadecane, 6-chlorooctadecane, 6-bromooctadecane, 7-chlorooctadecane, 7-bromooctadecane, 8-chlorooctadecane, 8-bromooctadecane, 9-chlorooctadecane, 9-bromooctadecane, 2-chlorononadecane, 9-bromononadecane, 3-chlorononadecane, 3-bromononadecane, 4-chlorononadecane, 4-bromononadecane, 5-chlorononadecane, 5-bromononadecane, 6-chlorononadecane, 6-bromononadecane, 7-chlorononadecane, 7-bromononadecane, 8-chlorononadecane, 8-bromononadecane, 9-chlorononadecane, 9-bromononadecane, 10-chlorononadecane, 6-bromohexadecane, 7-chlorohexadecane, 7-bromohexadecane, 8-chlorohexadecane, 8-bromohexadecane, 2-chloroheptadecane, 2-bromoheptadecane, 3-chloroheptadecane, 3-bromoheptadecane, 4-chloroheptadecane, 4-bromoheptadecane, 10 - chloroeicosane, 10 - bromoeicosane, 2-chloroheneicosane, 10-chloroheneicosane, 10-bromoheneeicosane, 2-chlorodocosane, 2-bromodocosane, 10-chlorodocosane, 10-bromodocosane, 2-chlorotricosane, 2-bromotricosane, 10-chlorotricosane, 10-bromotricosane, 2-chlorotetracosane, 2-bromotetracosane, 12-chlorotetracosane, 12-bromotetracosane, 2-chloropentacosane, 2-bromopentacosane, 12-chloropentacosane, 2-bromopentacosane, 2-chloro-3-methylbutane, 2-chloro-4-methylpentane, 2-chloro-5-methylhexane, 2-bromo-3-methylbutane, 2-bromo-4-methylpentane, 2-bromo-5-methylhexane, chlorocyclopropane, chlorocyclobutane, bromocyclopropane, bromocyclobutane, 1-chloro-2-methylcyclobutane, 1-bromo-3-n-hexylcyclobutane, bromocyclopentane, chlorocyclopentane, 1-bromo-3,3-diphenylcyclopentane, 1-chloro-3,3-diphenylcyclopentane, chlorocyclohexane, bromocyclohexane, chlorocycloheptane, chlorocyclooctane, bromocycloheptane, 2,5-dichlorododecane, chlorocyclopentadecane, bromocyclotriacontane, 2-chlorotetracontane, 3-chlorotetracontane, 4-chlorotetracontane, 5-chlorotetracontane, 6-chlorotetracontane, 7-chlorotetracontane, 8-chlorotetracontane, 9-chlorotetracontane, 10-chlorotetracontane, 11-chlorotetracontane, 12-chlorotetracontane, 13-chlorotetracontane, 14-chlorotetracontane, 15-chlorotetracontane, 16-chlorotetracontane, 17-chlorotetracontane, 18-chlorotetracontane, 19-chlorotetracontane, 20-chlorotetracontane, 2,39-dibromotetracontane, 1-bromo-14-chlorocyclotetracontane, 4-chloropentatriacontane, etc.

In carrying out the reaction defined and claimed herein it is absolutely necessary that a catalyst selected from the group consisting of ferric, stannic or zinc chlorides or bromides be used. The reaction is simply effected by bringing together the reactants and catalysts defined above. While I can employ the monobasic carboxylic acid and secondary alkyl halide in approximately stoichiometric amounts, that is, about 1:1, the molar proportions can vary from about 100:1 to about 1:10, preferably from about 10:1 to about 1.5:1. The amount of catalyst employed can be, for example, from about 0.10 to about 10, preferably from about one to about five percent, by weight relative to the total reaction mixture employed. The temperature is desirably low and can be in the range of about 60° to about 175° C., preferably about 100° to about 130° C. Pressure is not critical and can be in the range of about 10 to about 1000 pounds per square inch absolute or even higher, but in general about atmospheric pressure is preferred. Reaction time can be, for example, from about one minute to about 40 hours, preferably from about 15 minutes to about three hours.

During the course of the reaction an ester resulting from the reaction of the secondary alkyl chloride or bromide with the monobasic carboxylic acid is produced. In addition, HCl or HBr, which can be recovered, is produced and an olefin having the same number of carbon atoms as the reactant secondary alkyl halide is obtained. In a preferred embodiment the olefin so obtained can be recycled to the reaction zone and, under the conditions of reaction existing therein, will react with the monobasic carboxylic acid and desired ester is obtained, for example, as disclosed and claimed in my application Ser. No. 742,152, filed July 3, 1968, and now abandoned and assigned to the same assignee as the present application.

At the end of the reaction the reaction product can be cooled, for example, to room temperature and the contents thereof can be subjected to distillation conditions, for example, at a temperature of about 30° to about 50° C. and a pressure of about one to about 10 pounds per square inch absolute, to recover separately therefrom hydrogen halide, olefin, unreacted secondary alkyl halide and monobasic carboxylic acid and desired ester.

The process described and claimed herein can further be illustrated by the following.

EXAMPLE I

A series of four runs was made in which 2.27 grams of cyclohexyl bromide (13.9 millimols) and 22.70 grams of acetic acid were refluxed at 115° C. and atmospheric pressure over a period of four hours. In each of three runs one gram of $FeCl_3$, $SnCl_4$ or $ZnCl_2$ was used, while in the fourth run no catalyst was employed. At the end of each run the system was quickly cooled to 23° C. and then analyzed by gas chromatography. The results obtained are tabulated below in Table I.

TABLE I

| Run No. | Catalyst | Conversion based on unrecovered cyclohexyl bromide | Millimols in reaction product | | | | Ester yield, mol percent based on charge |
|---|---|---|---|---|---|---|---|
| | | | Cyclohexene | Cyclohexyl chloride | Cyclohexyl bromide | Cyclohexyl acetate | |
| 1 | None | 2.0 | 1.7 | 0.5 | 13.4 | 0.2 | 1.0 |
| 2 | $FeCl_3$ | 84.0 | 2.5 | 1.7 | 2.2 | 7.2 | 52 |
| 3 | $SnCl_4$ | 80.0 | 0 | 9.7 | 2.7 | 3.0 | 21 |
| 4 | $ZnCl_2$ | 92.0 | 3.7 | 1.7 | 0.1 | 9.2 | 66 |

EXAMPLE II

Two additional runs were carried out in a manner similar to Example I wherein 4.16 grams of 2-octyl chloride (28 millimols) were reacted with 20.84 grams of pelargonic acid at 100° C. and atmospheric pressure over a period of 24 hours. In one run one gram of $FeCl_3$ was present, in the other no catalyst was used. The results obtained are tabulated below in Table II.

TABLE II

| Run No. | Catalyst | Conversion based on unrecovered 2-octyl chloride | Millimols in reaction mixture | | | Ester yield, mol percent based on charge |
|---|---|---|---|---|---|---|
| | | | Octenes | Octyl chlorides | Octyl pelargonate | |
| 5 | None | 0 | 0 | 28.0 | 0 | 0 |
| 6 | $FeCl_3$ | 21.5 | 0.2 | 21.8 | 5.2 | 18.0 |

EXAMPLE III

Two further runs were carried out in a manner similar to Example I in which 2.27 grams of secondary dodecyl chlorides (11.1 millimols) were reacted with 22.7 grams of acetic acid at 115° C. and atmospheric pressure over a period of 24 hours. The dodecyl chlorides were approximately about 20 percent by weight of each other. In one run one gram of $FeCl_3$ was present, in the other no catalyst was used. The results obtained are tabulated below in Table III.

TABLE III

| Run No. | Catalyst | Conversion based on unreacted dodecyl chlorides | Millimols in reaction mixture | | | Ester yield, mol percent based on charge |
|---|---|---|---|---|---|---|
| | | | Dodecenes | Dodecyl chlorides | Dodecyl acetate | |
| 7 | None | 0 | 0 | 11.1 | 0 | 0 |
| 8 | $FeCl_3$ | 90 | 4.4 | 0.9 | 5.6 | 50 |

That it is imperative that the reaction herein be carried out in the presence of ferric, stannic or zinc chlorides or bromides is apparent from the following.

EXAMPLE IV

An additional series of runs was made as in Example I wherein 25 milliliters of a solution containing 12.7 weight percent of 2-octyl chloride and 87.3 weight percent acetic acid were heated at 115° C. and atmospheric pressure over a period of 16 hours. In each of the runs, except one, one gram of a metal salt was present during the reaction. The data obtained are tabulated below in Table IV.

TABLE IV

| Run No. | Catalyst | Mol percent 2-octyl chloride converted to octenes | Mol percent 2-octyl chloride converted to octyl acetate |
|---|---|---|---|
| 9 | None | 3.5 | 3.4 |
| 10 | Ferric chloride | 39.0 | 53.0 |
| 11 | Ferric bromide | 46.0 | 51.0 |
| 12 | Stannic chloride | 37.3 | 54.5 |
| 13 | Zinc chloride | 45.0 | 49.0 |
| 14 | Ferric acetate | 2.0 | 3.5 |
| 15 | Magnesium chloride | 7.0 | 3.9 |
| 16 | Magnesium acetate | 2.0 | 2.4 |
| 17 | Mercuric chloride | 20.0 | 15.0 |
| 18 | Antimony trichloride | 7.6 | 6.0 |
| 19 | Lithium chloride | 24.0 | 7.0 |
| 20 | Molybdenum pentachloride | 12.0 | 10.0 |

Obviously, many modifications and variations of the invention, as hereinabove set forth, can be made without departing from the spirit and scope thereof, and therefore only such limitations should be imposed as are indicated in the appended claims.

I claim:

1. A process for preparing an ester which comprises contacting a monobasic carboxylic acid selected from the group consisting of saturated straight chain aliphatic monobasic carboxylic acids and saturated branched chain aliphatic monobasic carboxylic acids with a secondary alkyl chloride or bromide and a catalyst selected from the group consisting of ferric, stannic or zinc chlorides or bromides at a temperature of about 60° to about 175° C.

2. The process of claim 1 wherein the monobasic carboxylic acid is a saturated straight chain aliphatic monobasic carboxylic acids having from two to 30 carbon atoms.

3. The process of claim 1 wherein the monobasic carboxylic acid is a saturated straight chain aliphatic monobasic carboxylic acids having from two to 22 carbon atoms.

4. The process of claim 1 wherein the monobasic carboxylic acid is acetic acid.

5. The process of claim 1 wherein the monobasic carboxylic acid is pelargonic acid.

6. The process of claim 1 wherein the temperature is about 100° to about 130° C.

7. The process of claim 1 wherein the catalyst is a ferric chloride or bromide.

8. The process of claim 1 wherein the catalyst is $FeCl_3$.

9. The process of claim 1 wherein the catalyst is a stannic chloride or bromide.

10. The process of claim 1 wherein the catalyst is $SnCl_4$.

11. The process of claim 1 wherein the catalyst is $ZnCl_2$.

12. The process of claim 1 wherein the secondary alkyl halide is a secondary alkyl chloride.

13. The process of claim 1 wherein the secondary alkyl halide is cyclohexyl bromide.

14. The process of claim 1 wherein the secondary alkyl halide is 2-octyl chloride.

15. The process of claim 1 wherein the secondary alkyl halide is a secondary dodecyl chloride.

References Cited

UNITED STATES PATENTS 3,510,500    5/1970    Walsh _____ 260—410.5

LEWIS GOTTS, Primary Examiner

D. G. RIVERS, Assistant Examiner

U.S. Cl. X.R.

260—410.9 R, 410.5, 410.6, 491, 493, 497 R, 677 XA

UNITED STATES PATENT OFFICE
CERTIFICATE OF CORRECTION

Patent No. 3,649,655      Dated March 14, 1972

Inventor(s) Charles M. Selwitz

It is certified that error appears in the above-identified patent and that said Letters Patent are hereby corrected as shown below:

Column 3, line 6, "9-bromo-" should be "2-bromo-".

Signed and sealed this 13th day of June 1972.

(SEAL)
Attest:

EDWARD M. FLETCHER, JR.
Attesting Officer

ROBERT GOTTSCHALK
Commissioner of Patents